Nov. 18, 1958     K. R. GEISER ET AL     2,860,507
AREA MEASURING GAGE
Filed Dec. 28, 1954
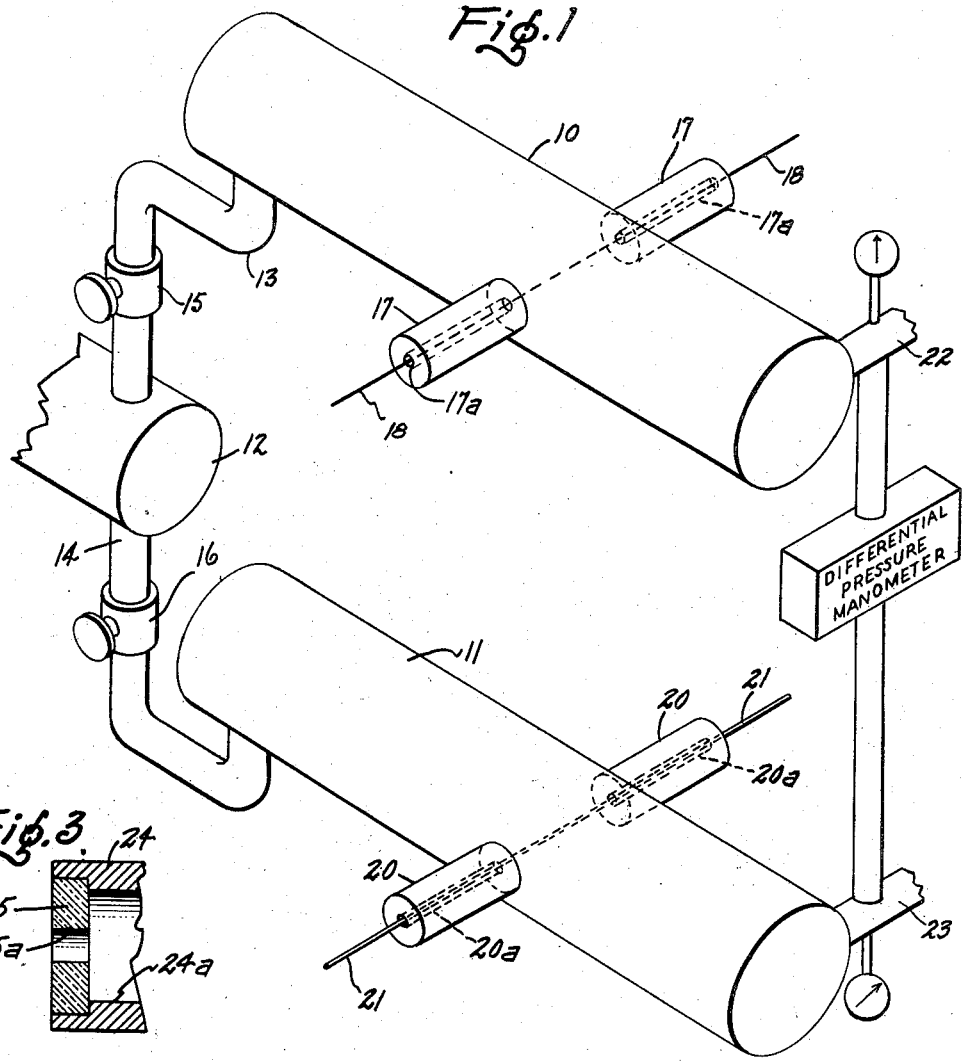
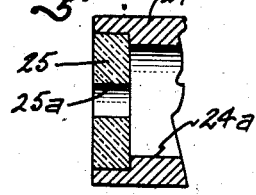
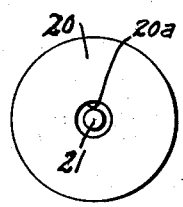
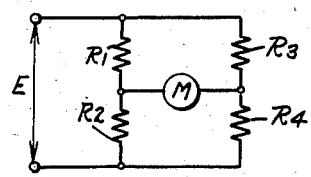
Inventors:
Kenneth R. Geiser
Emmett H. Wiley
Their Attorney United States Patent Office 2,860,507
Patented Nov. 18, 1958

2,860,507

AREA MEASURING GAGE

Kenneth R. Geiser, Schenectady, N. Y., and Emmett H. Wiley, South Euclid, Ohio, assignors to General Electric Company, a corporation of New York Application December 28, 1954, Serial No. 478,054

2 Claims. (Cl. 73—37.7)

This invention relates to gages for measuring the cross sectional area or diameter of wire or a like object, and more particularly to a novel fluid pressure gage for making such a measurement without contacting the object.

There are numerous occasions when it is desirable to measure the cross sectional area or diameter of a wire or a like object without contacting the object. For example, in the art of manufacturing electronic tube filament wire, the filament wire is generally coated with an insulating material capable of withstanding high temperatures. The insulating materials most often used for this purpose have poor adhesion to the wire and would be damaged by contact with the measuring apparatus. In addition, the insulating materials are quite abrasive in nature and tend to damage the measuring apparatus itself. Accordingly, it is an object of the present invention to provide a gage for measuring the cross-sectional area or diameter of an object such as wire without contacting the object.

Another object is to provide such a gage having high sensitivity and accuracy.

Another object is to provide such a gage that is adaptable to measure objects of widely varying sizes with equally high sensitivity in all cases.

A further object is to provide such a gage that is sturdily constructed of readily available components.

A gage constructed in accordance with the invention may comprise a pair of pressure or plenum chambers, each having an orifice therein with one of the orifices being adapted to receive the object whose cross-sectional area is to be measured. Fluid under pressure is supplied to the two plenum chambers through flow regulating means.

The pressure in each of the chambers is a function of the flow of fluid to the chamber from the source of supply and the flow of fluid out of the chamber through its orifice. Thus, when an object whose size is to be measured is placed in one of the orifices, the flow of fluid out of that chamber is partially restricted and the pressure in the chamber rises. The difference in pressure between the two chambers is an indication of the cross sectional area of the object placed in the orifice.

The novel features which are believed to be characteristic of the invention are set forth with particularity in the appended claims. The invention itself, however, both as to its organization and method of operation, together with further objects and advantages thereof, may best be understood by reference to the following description taken in conjunction with the accompanying drawings, in which:

Fig. 1 is a diagrammatic perspective view of apparatus constructed in accordance with the invention;

Fig. 2 is an end view of the orifice means embodied in the apparatus of Fig. 1;

Fig. 3 is a sectional view of a modified type of orifice means, and

Fig. 4 is a diagram of an electrical bridge circuit useful in understanding the operation of the gage of the invention.

For the sake of ease of description, the invention will be described as applied to the measurement of wire size. It is understood, however, that the gage of the invention may be applied to the measurement of cross sectional area of other objects and is not restricted to wire.

As seen in Fig. 1, a gage constructed in accordance with the invention comprises a pair of plenum chambers 10 and 11. The plenum chambers 10 and 11 are conventionally constructed of a relatively strong material such as steel, and are adapted to withstand pressures of the order of magnitude of 20–25 lbs. per square inch. Fluid under pressure is provided to the plenum chambers 10 and 11 from a conventional source (not shown) that feeds a supply pipe 12, which is connected to the chambers 10 and 11 by inlet pipes 13 and 14, respectively. The inlet pipes 13 and 14 are provided with resistive valves 15 and 16, respectively.

The resistive valves 15 and 16 are of conventional type well known in the art, which are adjustable and operate to restrict the flow of fluid through the inlet pipes 13 and 14. It is pointed out that the valves 15 and 16 are not pressure sensitive; that is, they do not operate to maintain predetermined pressures in the plenum chambers, but act only as throttles, and are similar to resistances in an electrical circuit.

The fluid supplied under pressure to the plenum chambers may be in either a gaseous or liquid state, and it is understood that the invention is not limited to the use of any particular fluid. However, it is pointed out that compressed air, which is generally conveniently obtainable, is well suited for this purpose.

The plenum chamber 10 is provided with a pair of oppositely disposed sleeves 17 having axially aligned bores 17a adapted to receive a wire 18 of standard size. The plenum chamber 11 is provided with a similar pair of sleeves 20 having axially aligned bores 20a adapted to receive a wire 21 whose size is to be gaged. Preferably, the bores 17a and 20a are equal in size. The sleeves 17 and 20 fit into suitable openings in the walls of the chambers 10 and 11, and are so mounted in the walls of the chambers that there is no leak about the joints.

The plenum chambers 10 and 11 are also provided with outlet pipes 22 and 23, respectively, to which conventional manometers or other pressure measuring devices (not shown) may be connected. If desired, the outlet pipes 22 and 23 may be connected to the two arms of a differential manometer of the type well known in the art, which serves to measure the difference in pressure between the two chambers. Obviously, if the manometers used are not of the differential type the difference between their readings may be computed manually.

As best seen in Fig. 2, the bores 20a of the sleeves 20 are sufficiently large to receive the wire 21 to be gaged, and provide an opening or orifice about the wire through which fluid may escape from the plenum chamber. Of course, the sleeves 17 on the plenum chamber 10 are similarly constructed to provide an opening around the standard size wire 18 through which fluid may escape from the chamber 10.

When the gage is in use, the standard size wire 18 may be supported by external means (not shown) in a stationary manner in the bores of the sleeves 17. However, should the gage of the invention be used in production control, it is probably that the wire 21 of unknown size will be continuously moving. Under these circumstances, it is difficult to keep the wire 21 from occasionally touching the sleeve 20. Thus, if the wire 21 has an abrasive coating thereon, as is often the case, some wear of the sleeves may result from the occasional contact and the apertures around the wire 21 may be increased in size, thus impairing the accuracy of the gage. Therefore, it may be desirable to provide inserts to fit within the sleeves through which the moving wire passes. As seen in Fig. 3, a sleeve 24 may be provided having a bore 24a of sufficient diameter to prevent contact of the moving wire 21 with the sleeve, and an insert 25 may fit within the outer end of the sleeve. The insert is provided with an aperture 25a that may be of the same size as the bores 20a of the sleeves 20 (Fig. 1) and the insert may be made of a ceramic or other similar material, that resists the wear that tends to result from occasional contact of the moving abrasive-coated wire 21 as it passes through the insert. Each of the sleeves 20 shown in Fig. 1 may be replaced by a sleeve 24.

In use, fluid under pressure is provided to the plenum chamber 10 from supply pipe 12 through resistive or flow regulating valve 15, and the fluid within the chamber 10 escapes therefrom through the bores 17a in the sleeve 17 partially obstructed by the standard size wire 18. The pressure within the plenum chamber 10 is a function of the pressure of the fluid provided to the supply pipe 12, the flow of fluid through resistive valve 15 and the flow of fluid out of the chamber through the bores of the sleeves 17. Similarly, the pressure within the plenum chamber 11 is a function of the pressure of the fluid in supply pipe 12, the flow of fluid through resistive valve 16 and the flow of fluid out through the bores of the sleeve 20 partially obstructed by the wire 21 whose size is to be measured. If all of the conditions are maintained constant except for the flow of fluid out of chamber 11 through the bores 20a, the difference in pressure between the chambers 10 and 11 is a function of that variable flow of fluid from the chamber 11.

A better understanding of the invention and its method of operation may be obtained from a consideration of the mathematical relationships involved in the apparatus. It is most convenient to consider the pressure bridge arrangement of the invention in terms of an electrical bridge of the type illustrated in Fig. 4. It is seen that the bridge comprises a pair of series resistances $R_1$ and $R_2$ and a second pair of series resistances $R_3$ and $R_4$, with the two pairs connected in parallel and adapted to be energized by a source of voltage E (not shown). A meter M is connected between the juncture of resistors $R_1$ and $R_2$ and the juncture of resistors $R_3$ and $R_4$ to measure the unbalance of the bridge. In the electrical bridge representation of the perssure bridge arrangement of the invention, $R_1$ represents the resistance valve 15, $R_2$ represents the partially obstructed bores 17a in the sleeves 17, $R_3$ represents the resistive valves 16 and $R_4$ represents the partially obstructed bores 20a in the sleeves 20. The voltage E across which the electrical bridge is connected represents the pressure of the fluid provided to the supply pipe 12, and the meter M may represent a conventional differential manometer connected to the outlet pipes 22 and 23 of the plenum chambers.

As is well known in the electrical art, the voltage $E_2$ appearing across resistor $R_2$ may be expressed as (1) $$E_2 = E\left(\frac{R_2}{R_1+R_2}\right)$$

Similarly, the voltage $E_4$ appearing across resistor $R_4$ may be expressed as (2) $$E_4 = E\left(\frac{R_4}{R_3+R_4}\right)$$

The difference $\Delta E$ between these voltages, which will be indicated by the meter M, may be expressed as (3) $$\Delta E = E_2 - E_4 = E\left(\frac{R_2}{R_1+R_2} - \frac{R_4}{R_3+R_4}\right)$$

It is apparent from Equation 3 that a change in the difference voltage $\Delta E$, when all of the factors are held constant with the exception of one resistance, is an indication of the amount of change in that resistance. Also, if the bridge is initially balanced and thereafter all of the factors but one remain constant, the magnitude of the difference voltage $\Delta E$ is an indication of the amount of change in the variable factor.

One of the primary advantages of a bridge arrangement is that, when the bridge is balanced, variations of the source voltage E do not unbalance the bridge and the difference voltage $\Delta E$ remains zero. Even when the bridge is unbalanced, a variation in source voltage does not result in a first order change in $\Delta E$, and the effect of the source voltage variation may be considered as minor.

Applying the theory of the electrical bridge circuit to the pressure bridge of the invention (Fig. 1), it is seen that, when the flow of fluid through the resistive valves 15 and 16 is constant and the flow of fluid through the orifices in the sleeves 17 is constant, any change in the flow of fluid through the orifices in the sleeves 20 will be reflected by a change in the reading of a differential manometer connected to the outlet pipes 22 and 23 of the plenum chambers.

Several modes of operation of the gage of the invention are possible. However, as is well known from the theory of operation of an electrical bridge comprising four resistances, the bridge has maximum sensitivity when the four resistances are initially equal. Therefore, in the preferred mode of operation of the gage of the invention, the resistive valves 15 and 16 and the orifices in the sleeves 17 offer equal resistances to the flow of fluid and that resistance is preferably approximately the same as the resistance offered by the orifices in the sleeves 20 when partially obstructed by the wire 21 whose size is to be gaged. It is understood that terms referring to the resistance of the orifices of a chamber mean the joint resistance of the two orifices of that chamber acting together.

The "balanced bridge" method of operation may be obtained with or without the use of a standard size wire 18 in the orifices of plenum chamber 10. If desired, the cross-sectional area of the bores 17a in the sleeves 17 may be made equal to the cross-sectional area of the opening around the wire 21 of unknown size when placed in the bores 20a of sleeves 20, assuming the wire 21 to be of the desired size. It is generally more convenient and lends more utility to the instrument to make the bores 17a and 20a of equal size, and to use a standard wire 18 to reduce the orifices in the sleeves 20 when a wire of desired size is placed therein. That mode of operation is particularly useful when the gage of the invention is used as a control instrument. In that case, when the sizes of the unobstructed bores or orifices of the sleeves 17 and 20 are equal, a wire 18 of standard size or diameter may be placed in the orifices in the sleeves 17 with the size of the wire 18 being equal to the desired size of the wire 21, which advances through the bores of the sleeves 20. The resistive valves 15 and 16 are then adjusted so that each of their resistances is equal to the resistance offered by the orifices in the sleeves 17 with the standard wire placed therein. Any variation in the size or cross-sectional area of the wire 21 from that of the standard wire 18 will cause a differential manometer connected to the outlet pipes 22 and 23 to give an indication of that difference. Of course, the differential manometer may be calibrated to obtain the actual diameter of the wire 21 or its departure from a desired size.

Especial advantage is derived from operating the gage as a balanced bridge in that a change in pressure of the fluid in supply pipe 12 affects the pressure in both plenum chambers equally, when the bridge is balanced. Even when the pneumatic bridge arrangement is unbalanced by a variation in size of the wire 21 being gaged, a change in the pressure in supply pipe 12 causes only a small change in the difference in pressures between the plenum chambers, the change being at least of the second order relative to the change in supply line pressure. This is not the case without a bridge arrangement. In addition, when the bridge is initially balanced, maximum sensitivity is obtained. It has been found in practice that a change in diameter of wire 21 of .0001″ may be detected, when using a supply line air pressure of 15 p. s. i.., and bore diameters in sleeves 17 and 20 of 0.040″ for wires 18 and 21 of the order of 0.010″ diameter. The resistive valves were adjusted for equal values with each of those values being equal to the resistances offered by the orifices in the sleeves 17 and 20 with equal diameter wires 18 and 21 placed therein. Thus, the initial pressure in each of the plenum chambers 10 and 11 is equal to one-half the supply line pressure. Of course, the pneumatic bridge may be operated continuously in an unbalanced state with some sacrifice in sensitivity.

It is apparent that the scale of the gage may be changed merely by changing the size of the standard wire inserted into plenum chamber 10. Thus, if it is desired to change from measuring wire of one diameter to wire of another diameter, it is necessary only to change the standard size wire to the new diameter in order to maintain the "balanced bridge" mode of operation with its attendant high sensitivity.

It is pointed out that the positions of the wires within the orifices is immaterial. The positions of the wires may vary without giving indications on the pressure measuring devices.

Although a specific embodiment of the invention has been illustrated and described, it is understood that various changes may be made therein by one skilled in the art and it is contemplated by the appended claims to cover any such modifications as fall within the true spirit and scope of the invention.

What we claim as new and desire to secure by Letters Patent of the United States is:

1. An area measuring gage comprising a pair of plenum chambers, each said chamber having a pair of axially aligned orifice means therein, said axially aligned orifice means in one said chamber receiving a continuously running wire whose size is to be measured and having replaceable inserts, said axially aligned orifices in the other said chamber receiving a wire of standard diameter, means for connecting said chambers to a source of fluid under pressure, said connecting means including means for regulating the flow of fluid to said chambers, and means connected to said chambers for measuring the pressure in each said chamber.

2. An area measuring gage comprising a pair of plenum chambers, each said chamber having a pair of axially aligned orifices therein, one of said pair of orifices being adapted to receive a continuously running filament whose cross sectional area is to be measured and the other of said pairs being adapted to receive a filament of standard size, means for connecting said chambers to a source of fluid under pressure, means secured to said connecting means for regulating the flow of fluid into said chambers, the flow of fluid out of said chambers through said orifices being equal when said standard filament and said filament to be measured are of equal cross sectional area, and means connected to said chambers for measuring the difference in pressure between said chambers during movement of said first filament thereby to indicate the cross sectional area of the filament continuously during such movement.

References Cited in the file of this patent

UNITED STATES PATENTS

| | | |
|---|---|---|
| 2,014,998 | Baguley | Sept. 17, 1935 |
| 2,077,525 | Mennesson | Apr. 20, 1937 |
| 2,266,566 | Poole | Dec. 16, 1941 |
| 2,516,932 | Wainwright | Aug. 1, 1950 |
| 2,529,170 | Mennesson | Nov. 7, 1950 |
| 2,539,624 | Huggenberger | Jan. 30, 1951 |

FOREIGN PATENTS

| | | |
|---|---|---|
| 402,008 | Great Britain | Nov. 23, 1933 |
| 842,541 | France | Mar. 6, 1939 |
| 280,223 | Switzerland | Jan. 15, 1952 |
| 1,043,105 | France | June 10, 1953 |